April 8, 1947. V. HARASTY 2,418,636
SMALL BOAT CONSTRUCTION
Filed Dec. 7, 1944 3 Sheets-Sheet 3
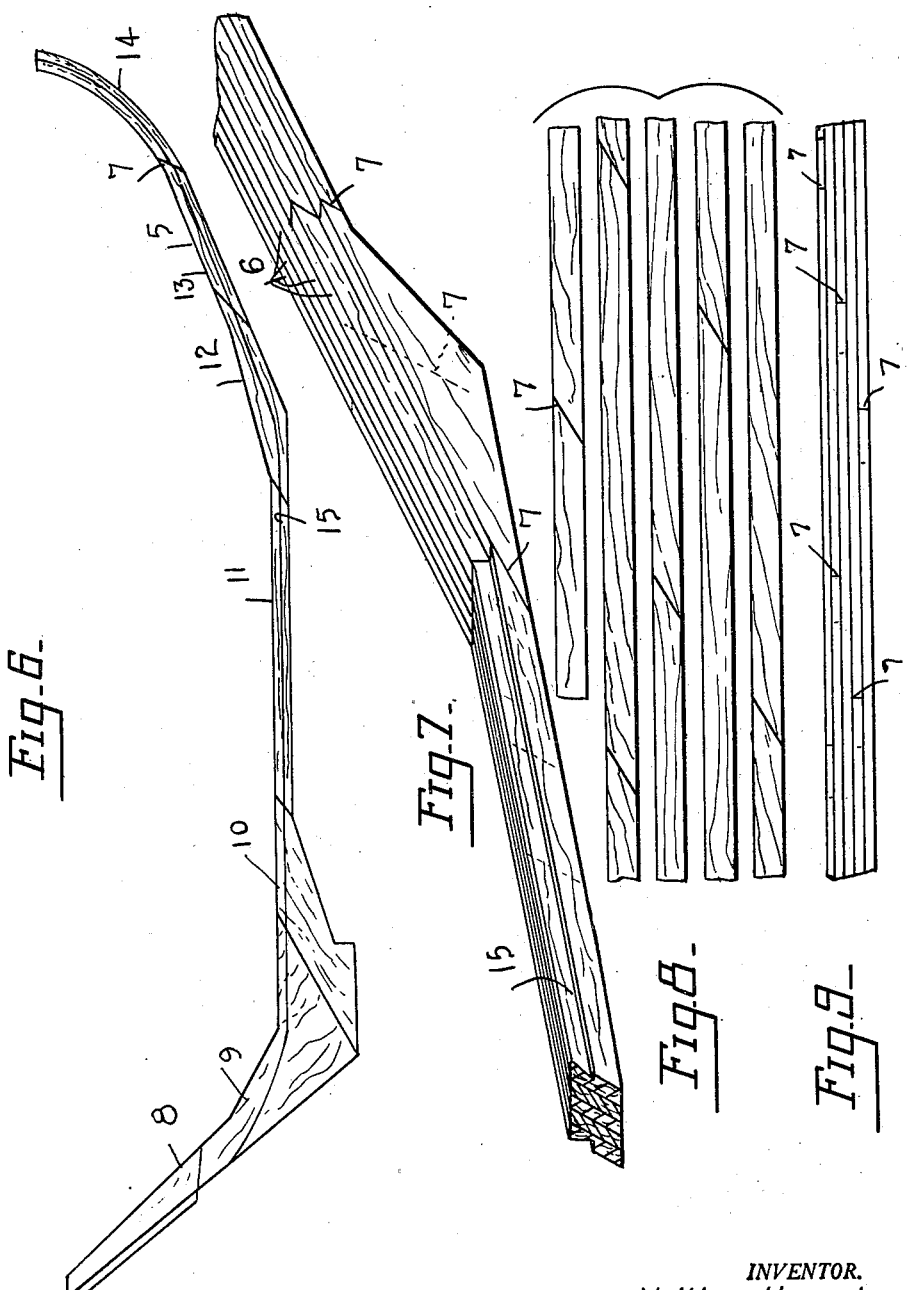
INVENTOR.
Viktor Harasty
BY
Carl Miller
ATTORNEY Patented Apr. 8, 1947

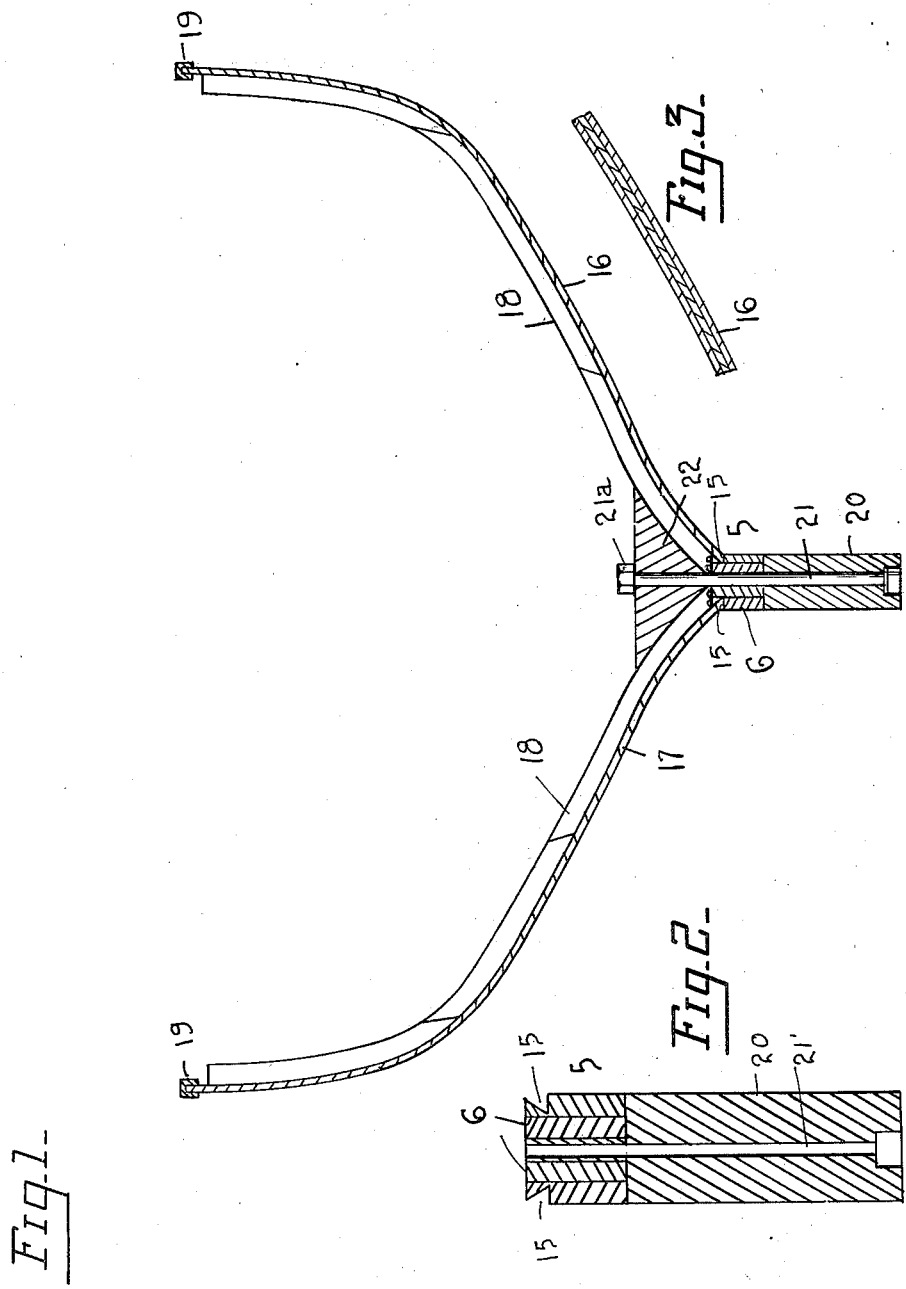

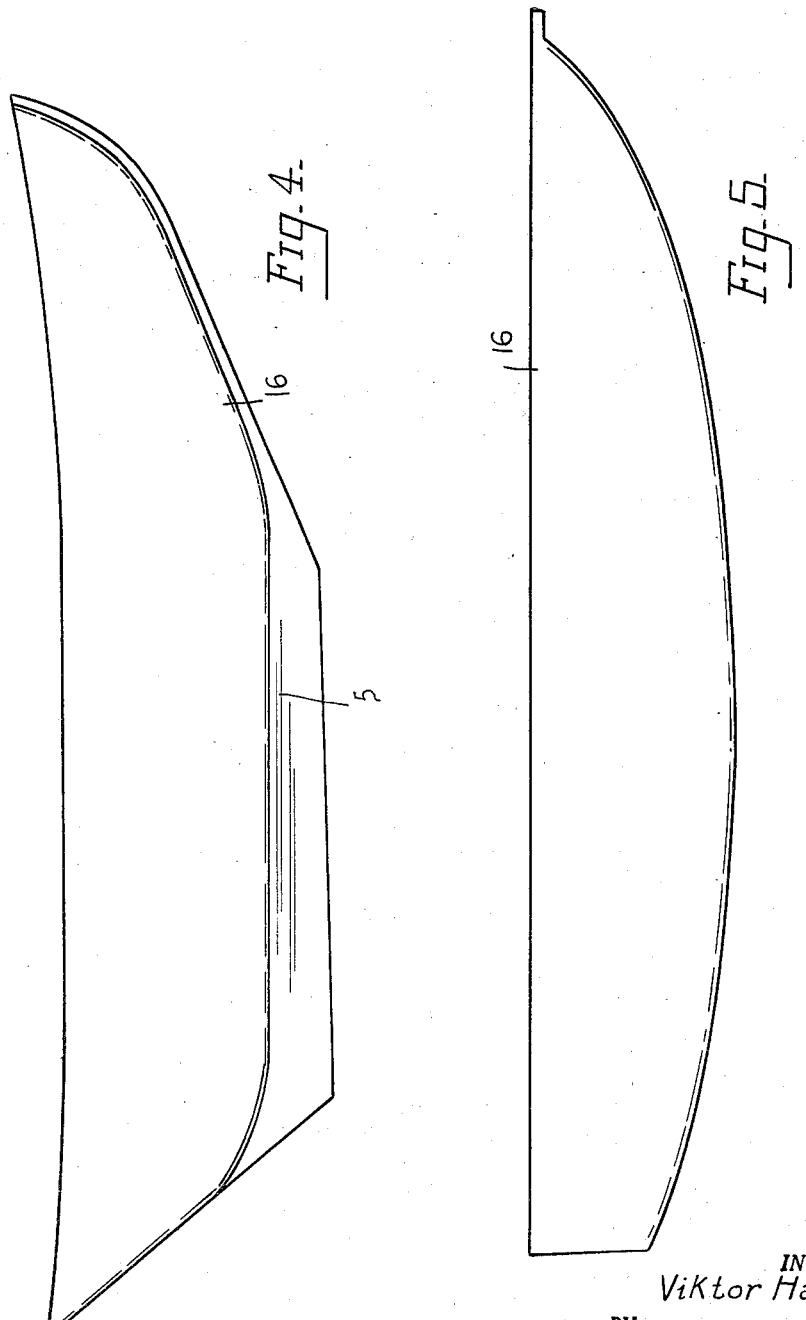

2,418,636

UNITED STATES PATENT OFFICE 2,418,636

SMALL BOAT CONSTRUCTION

Viktor Harasty, Whitestone, N. Y.

Application December 7, 1944, Serial No. 567,023

1 Claim. (Cl. 9—6)

This invention relates to a method of constructing small boats, for the purpose of reducing the cost of construction, of permitting of the nesting of the main parts of the boat for storage and transportation, previous to final assembly, and of insuring maximum strength and stability of construction when final assembly of the parts is made.

One of the objects of the invention is to provide a method which will include the construction of primary half-hull sections, from molded laminated wood or other suitable materials, and the union of these half-hull sections with the keel, so as to provide a complete hull structure.

Another object of the invention is the construction of a laminated keel, constructed from pieces of parallel wood, united by cold setting waterproof adhesive or glue, having well known plastic properties, with bias cut meeting ends, arranged with the grain of the wood running in the direction of the length of each piece, so that maximum structural strength is provided in the composite or laminated wood keel.

With the above and other objects in view the invention relates to certain new and useful constructions, combinations, and arrangements of parts, and certain new and useful method steps, fully described in the following specification, and clearly illustrated in the accompanying drawings, in which:

Fig. 1 is a vertical cross sectional view through a complete boat body or hull, showing the laminated keel and the sectional hull construction, and the joints between the hull sections and the keel.

Fig. 2 is a vertical sectional view, on an enlarged scale of the laminated keel.

Fig. 3 is a detail enlarged sectional view of a portion of the wall of one of the hull sections.

Fig. 4 is a side view of a completed hull.

Fig. 5 is a side view of a complete hull section, slightly modified, before being joined to the keel.

Fig. 6 is a side view showing the construction of one form of the laminated keel.

Fig. 7 is an isometric view, enlarged, of a portion of the laminated keel, shown partly in cross section.

Fig. 8 is a fragmentary plan view of a group of individual pieces before being joined to make the stock for the laminated keel.

Fig. 9 is an edge view of the complete stock for the laminated keel.

Referring to the accompanying drawings illustrating the practical steps for carrying out my method and for constructing the improved boat hull, 5 designates a keel, which is shown to be constructed of a plurality of individual plies or laminae 6, which are joined side-by-side to each other to provide a solid laminated stock. The individual plies may be constructed from short length pieces of wood or other similar material, and the adjacent ends of the sections of any one ply or lamina have bias cut meeting ends 7, and the bias cut meeting ends of one ply or lamina are arranged in staggered relation to the bias cut ends of any and all other plies or laminae.

These plies or laminae are bonded to each other, at all contacting joint faces, by cold setting waterproof glue or adhesive, which is known to have certain plastic properties. This bonding is done with the use of pressure clamps to insure maximum penetration of the adhesive into the pores of the wood.

In constructing the complete keel, so that the required form is produced, a plurality of wood strips are constructed to provide the end keel section 8, the next keel section 9, the next keel section 10, the central bottom keel section 11, the rising keel section 12, the next keel section 13, and the last keel section 14. The different strips or plies to form each section are arranged so that the bias cut meeting ends will be arranged in staggered relation to each other.

The different sections are so related to each other that the bottom profile of the hull is established by the angles between the different keel sections.

The angular relation of the linear strips of one keel section to the linear strips of the adjacent keel sections, is established by the angle of the bias ends by which the adjacent keel sections are joined.

By this method of constructing the keel short pieces of linear wood strips may be bonded to each other and then saw cut and shaped by the required production tools, to the form required for the particular section of the keel. By designing the bias cut meeting ends of adjacent strips of the same lamina to allow for the required angular disposition of the keel sections, any form of the boat keel may be developed by using wood strips considerably shorter in length than the length of the complete boat keel.

The width of the individual wood strips employed will be determined by the maximum width of the individual keel section, to be built by lamination.

The completed keel is then shaped or finished to provide rabbet groove 15 on each side of the completed keel, as shown in Figs. 1, 6 and 7.

The hull is constructed in two similar matching sections 16 and 17, each section being made of laminated sheet wood, the different layers of which are bonded to each other by cold setting waterproof glue or adhesive. The material to form each hull section is then molded between mold forms under pressure, so as to produce right and left hull sections. Each hull section is reinforced by means of laminated cross ribs 18, which may be of any number required to strengthen the boat hull. The lower ends of these laminated ribs are placed on top of the keel, and the lower edge of each hull section is fitted into the rabbet groove 15, and all meeting joints are sealed with cold setting waterproof glue, and the bonding completed under the pressure of suitable form sustaining clamping tools or fixtures. The upper marginal edge of each hull section is reinforced by means of the U-shaped straddle or edging strip 19, bonded in place by cold setting waterproof glue.

The keel is weighted by means of a heavy metal member or mass 20, which is designed in conformity with the form requirements of the keel, and is of the same width as the keel. This member is preferably constructed of lead or of its alloys, and is retained in place by means of strong bolts 21, which extend through the laminated body of the keel. The converging meeting lower edges or portions of the hull sections are joined by the saddle V-shaped central member or beam 22, through which the upper ends of the bolts 21 extend, the bolts being retained under clamping tension, by means of the nuts 21a threaded on the upper ends of the bolts against the V-shaped member or beam 22. This beam 22 is bonded in place by waterproof glue.

The invention is particularly applicable for the construction of small service and sporting boats, and provides a cheaper and stronger small boat, using waterproofed wood, than is now possible.

It is understood that various modifications of the method steps disclosed, and of the laminated keel and beam or rib construction, and sectional hull construction, disclosed, may be varied within the scope of the claim of this application, without departing from the scope of the invention.

Having described my invention I claim as new:

A boat consisting of a laminated wood keel, the keel being composed of parallel linear wood strips bonded together by cold setting waterproof glue, the wood strips being arranged in multiple sections with biased end meeting joints, said sections having varying end angular relation to each other with each section composed of parallel wood strips, the direction of the grain in each wood strip running with its length, the bias cut meeting ends of one strip or lamina being arranged in staggered relation to the bias cut meeting ends of an adjacent strip, said keel having parallelly extending rabbet grooves on each side of and adjacent the top thereof, right and left hull sections having their inner and lower edges disposed in said grooves and bonded therein by cold setting waterproof glue, and a keel weight connected to the bottom side of the laminated keel.

VIKTOR HARASTY.

REFERENCES CITED

The following references are of record in the file of this patent:

UNITED STATES PATENTS

| Number | Name | Date |
| --- | --- | --- |
| 250,717 | Durant | Dec. 13, 1881 |
| 2,243,372 | Chlopicki | May 27, 1941 |
| 1,885,198 | Hale | Nov. 1, 1932 |
| 1,992,700 | Huckins | Feb. 26, 1935 |